United States Patent [19]

Sarin et al.

[11] 4,388,085

[45] Jun. 14, 1983

[54] ABRASION RESISTANT ARTICLES BASED ON SILICON NITRIDE

[75] Inventors: Vinod K. Sarin, Lexington; Sergej-Tomislav Buljan, Acton, both of Mass.

[73] Assignee: GTE Laboratories Incorporated, Waltham, Mass.

[21] Appl. No.: 317,811

[22] Filed: Nov. 3, 1981

Related U.S. Application Data

[62] Division of Ser. No. 167,258, Jul. 9, 1980, abandoned.

[51] Int. Cl.³ .................... C04B 35/56; C04B 35/58
[52] U.S. Cl. ............................... 51/307; 51/308; 51/309; 264/65; 501/87; 501/93; 501/97; 501/98
[58] Field of Search .................. 51/307, 308, 309; 501/97, 98

[56] References Cited

U.S. PATENT DOCUMENTS

| | | | |
|---|---|---|---|
| 4,099,979 | 7/1978 | Lange et al. | 501/97 |
| 4,179,301 | 12/1979 | Buljan | 501/97 |
| 4,227,842 | 10/1980 | Samanta et al. | 51/308 |
| 4,252,768 | 2/1981 | Perkins et al. | 501/87 |
| 4,280,850 | 7/1981 | Smith et al. | 501/97 |
| 4,280,973 | 7/1981 | Moskowitz | 51/307 X |

FOREIGN PATENT DOCUMENTS

537986 3/1977 U.S.S.R. .

*Primary Examiner*—Helen M. McCarthy
*Attorney, Agent, or Firm*—Jerry F. Janssen

[57] ABSTRACT

A composite article and cutting tool are prepared by densification to form a body consisting essentially of particles of hard refractory material uniformly distributed in a matrix consisting essentially of a first phase and a second phase, said first phase consisting essentially of crystalline silicon nitride and said second phase being an intergranular refractory phase comprising silicon nitride and a suitable densification aid comprising magnesium oxide and silicon dioxide.

4 Claims, 3 Drawing Figures

ABRASION RESISTANT ARTICLES BASED ON SILICON NITRIDE

This is a division, of application Ser. No. 167,258 filed July 9, 1980, now abandoned.

BACKGROUND OF THE INVENTION

This invention relates to abrasion resistant materials and to articles of manufacture made therefrom. More particularly, it is concerned with abrasion resistant materials comprising particles of a hard refractory material distributed in a matrix containing silicon nitride, and with articles made therefrom.

U.S.S.R. Patent No. 537,986 discloses a ceramic cutting tool composition of silicon nitride, titanium carbide, and magnesium oxide or aluminum oxide.

U.S. Pat. Nos. 4,184,882 and 4,187,116 to Lange disclose a densified composite of silicon nitride, silicon carbide, and magnesium oxide.

SUMMARY OF THE INVENTION

In accordance with the present invention, there is provided a composite article of manufacture consisting essentially of particles of a hard refractory material distributed in a two phase matrix consisting essentially of a first phase of crystalline silicon nitride and a second refractory intergranular phase of silicon nitride and an effective amount of densification aid comprising magnesium oxide and silicon dioxide.

In accordance with other aspects of the present invention, there are provided a powder mixture, and a process for making the articles of the present invention from the powder mixture.

For a better understanding of the present invention, together with other and further objects, advantages and capabilities thereof, reference is made to the following disclosure and appended claims in connection with the above-described drawing.

DETAILED DESCRIPTION

Abrasion resistant articles according to the present invention comprise finely divided particles of a hard refractory material uniformly distributed in a two phase matrix. By the term hard refractory material, as used throughout this specification and appended claims, is meant any carbide or nitride of a refractory metal having a microhardness greater than 1000 kg/mm$^2$ and a fusion or decomposition temperature greater than 1500° C. Typical hard refractory materials include the carbides and nitrides and combinations including solid solutions thereof of titanium, vanadium, chromium, zirconium, niobium, molybdenum, hafnium, tantalum and tungsten.

The hard refractory material is uniformly distributed in a two phase matrix consisting essentially of a first phase of crystalline silicon nitride and a second refractory intergrannular phase comprising silicon nitride, magnesium oxide, and silicon dioxide.

The average particle size of the hard refractory material incorporated into articles in accordance with this invention is chosen dependent upon the use to which the article is put, but ranges below about 20 microns. For example, for cutting tool applications the average particle size is chosen near the lower end of this range, preferably below about 5 microns. On the other hand, for mining tools and wear parts, average refractory material particle sizes above 5 microns are used.

Figure 1:
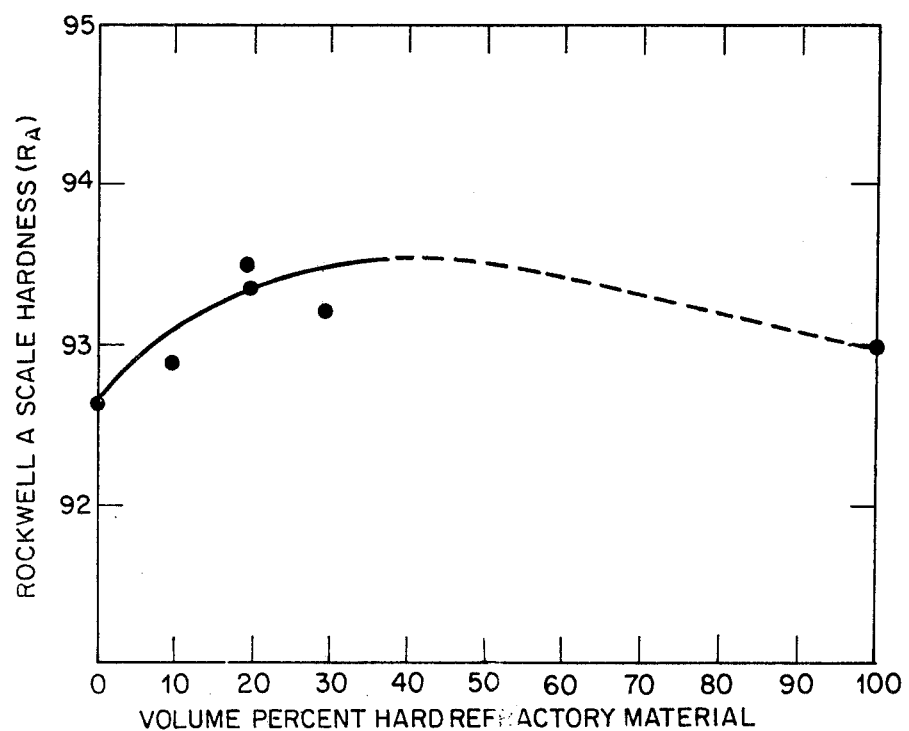
FIG. 1 is a graph illustrating the variation of hardness with refractory material content of articles in accordance with this invention.

The useful life and performance of articles in accordance with this invention depend, in large part, on the volume taken up by the particles of hard refractory in the total composite. As discussed further below, it has been found that the hardness of the composite articles generally increases with increasing hard refractory material content, but tends to decrease at concentrations above about 60% by volume of the densified composite. The preferred range of hard refractory material content is from about 15% to about 50% by volume, with the optimum range being about 20% to 40% by volume. FIG. 1 illustrates by way of example the variation of hardness with refractory content of densified composites in accordance with the present invention incorporating various amounts of titanium carbide. The data plotted in that figure show the general trend of increasing hardness as the hard refractory content is increased, followed by a decrease in hardness at higher concentrations.

The articles of this invention possess a composite microstructure in which the particulate hard refractory is distributed throughout the two phase ceramic matrix. The first phase of the ceramic matrix consists essentially of grains of Si$_3$N$_4$ and the second phase comprises a continuous, refractory, intergranular phase of silicon nitride, magnesium oxide and silicon dioxide. Because the second phase is essentially continuous, and because impurities and additives present in the body tend to concentrate in the second intergranular phase during processing, the composition of this phase profoundly affects the high temperature properties of the densified composite and it is preferred that the amounts of such additives including cation impurities not exceed 3 weight percent of this phase.

It is important to incorporate into this second phase of the ceramic matrix a densification aid which both permits densification of the total composite to densities approaching theoretical and, at the same time, does not deleteriously affect the high temperature strength and creep resistance of the overall composite. It has been found in accordance with the principles of this invention that a mixture of magnesium oxide with lesser amounts of silicon dioxide provides such an effective densification aid. Preferably, this densification aid comprises from about 1% to about 25% by weight of the ceramic matrix, exclusive of the hard refractory material. More preferably, the densification aid of magnesium oxide and silicon dioxide comprises from about 1% to about 10% by weight of the matrix.

The magnesium oxide comprises the chief ingredient of the densification aid, but lesser amounts of silicon dioxide in the densification aid have been found to be necessary for efficient sintering. Preferably, the silicon dioxide is present in the densified composite article in amounts below about 5% by weight of the second intergranular phase. The silicon dioxide may be added to the initial powder mixture employed in formation of the densified composite, or alternatively, formed in situ by controlled oxidation of the silicon nitride powder. In the latter instance, pure silicon nitride starting material is partially oxidized by heating in an oxidizing atmosphere to obtain the desired silicon dioxide content. Subsequently the hard refractory material is added, together with magnesium oxide, sintering and/or hot pressing to obtain the densified composite are carried out under a non-oxidizing atmosphere such as nitrogen.

TABLE

| EX. | COMPONENT* | | | | | | | DENSITY (PERCENT THEORETICAL) | HARDNESS ($R_A$) |
|---|---|---|---|---|---|---|---|---|---|
| | SILICON NITRIDE** | | MAGNESIUM OXIDE** | | SILICON DIOXIDE** | | REFRACTORY MATERIAL*** | | |
| I | 96.03 | (96.03) | 3.00 | (3.00) | 0.97 | (0.97) | None | — | — | 97.5 | 92.56 |
| II | 93.55 | (95.95) | 3.00 | (3.07) | 0.95 | (0.98) | TiC | 2.5 | (1.7) | 97.9 | — |
| III | 86.13 | (95.70) | 3.00 | (3.33) | 0.87 | (0.97) | TiC | 10.0 | (7.2) | 98.3 | 92.9 |
| IV | 76.23 | (95.29) | 3.00 | (3.75) | 0.77 | (0.96) | TiC | 20.0 | (14.8) | 97.6 | 93.4 |
| V | 76.23 | (95.29) | 3.00 | (3.75) | 0.77 | (0.96) | TiC | 20.0 | (15.2) | ~100 | 93.5 |
| VI | 66.33 | (94.76) | 3.00 | (4.29) | 0.67 | (0.95) | TiC | 30.0 | (23.7) | ~100 | 93.2 |

*Percentage figures not enclosed in parentheses are percentages by weight of each component based upon the weight of the total mixture.
**Percentage figures for silicon nitride and densification aid enclosed in parentheses are percentages by weight of each component based upon the weight of the silicon nitride-densification aid host matrix.
***Percentage figures for the refractory material enclosed in parentheses are percentages by volume based upon volume of the total densified compact.

As shown by the data appearing in the accompanying Table, dense composite articles comprising a two phase silicon nitride based ceramic host and containing titanium carbide have been prepared with densities greater than 97.5% of theoretical, optimally approaching 100% of theoretical. At these densities, achievable with the combined magnesium oxide and silicon dioxide densification aid in accordance with the present invention, the densified composite articles possess Rockwell A hardness values in excess of 92.5. The composite articles in accordance with this invention retain high strength, creep resistance, and fracture toughness even at temperatures exceeding 1200° C.

Figure 2:
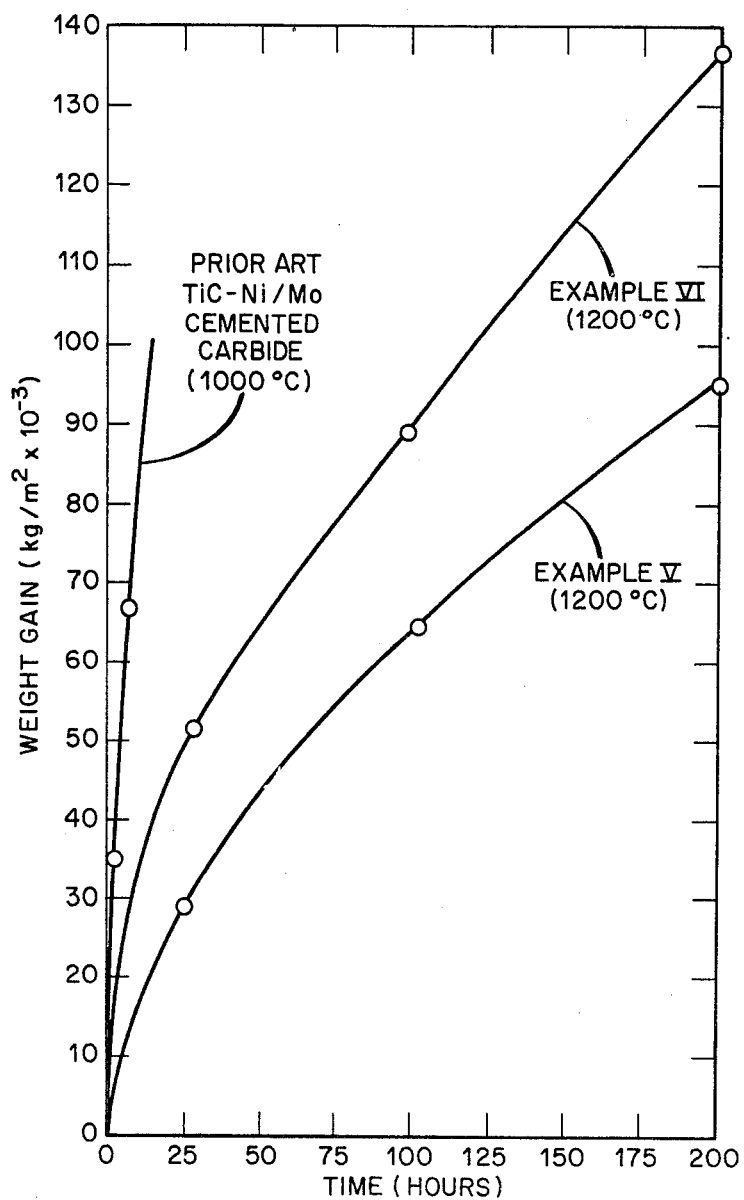
FIG. 2 is a graph comparing oxidation resistance of a prior art material to that of articles of the present invention.

Moreover, as shown by the data plotted in FIG. 2, articles in accordance with the present invention in which titanium carbide is distributed in a silicon nitride, magnesium oxide, silicon dioxide ceramic host matrix possess much greater resistance to oxidation than a typical prior art composite article in which titanium carbide is distributed in a nickel/molybdenum matrix.

The data of FIG. 2 were obtained by heating densified composites of the present invention, having the compositions corresponding to Examples V and VI of the accompanying Table, to 1200° C. in air. Oxidative weight gain was recorded as kg/m² of surface area. For comparison, a prior art TiC-Ni, Mo cemented carbide material was similarly treated, but at 1000° C. Since appreciable oxidation of titanium carbide is known to occur at temperatures as low as 427° C., the data of FIG. 2 illustrate an appreciable reduction in the oxidation rate of composite materials of the present invention in which titanium carbide is incorporated into a silicon nitride, magnesium oxide, silicon dioxide ceramic host over that of known materials in which titanium carbide is cemented in a metallic matrix.

In accordance with another aspect of the present invention, the starting powder composition consists essentially of from about 25% to about 95% by weight of a silicon nitride powder, from about 1% to about 10% by weight of powdered densification aid, and from about 5% to about 40% by weight of a hard refractory material powder. Additional ingredients are preferably present in the starting powder in amounts less than 5% by weight, based on the total weight of the starting powder.

A composition for the production of abrasion resistant materials according to the present invention may be made by employing $Si_3N_4$ powder, generally of particle size below about 3 microns, which is preferably either partly crystallized amorphous material or a mixture of substantially completely amorphous and substantially completely crystalline material. The crystalline $Si_3N_4$, which may be either the alpha or beta polymorph or a mixture of these, is preferably present in the amount of from 5% to 60% by weight of the total amount of $Si_3N_4$ powder, the remainder being substantially amorphous. The percent crystallinity of the starting material, if unknown, may be determined by either x-ray diffraction techniques in which the intensities of the diffraction peaks of crystalline material are compared with those of a known standard, or by infrared spectroscopic methods in which the relative intensities of the broad adsorption bands of the amorphous material are compared to the narrow adsorption bands of the crystalline material.

Silicon nitride composite ceramic articles produced from such starting powder compositions exhibit densities approaching theoretical and high modulus of rupture values.

The starting powder composition contains from about 1% to about 10% by weight of a powdered densification aid consisting essentially of magnesium oxide and silicon dioxide. As set out above, the silicon dioxide may be added to the starting powder composition or generated in situ by controlled partial oxidation of the starting silicon nitride. During sintering of the powder mixture to a densified composite, the silicon dioxide tends to concentrate in the second intergranular phase. The amount of silicon dioxide initially present in the starting powder composition is selected to produce less than 5% silicon dioxide by weight, based on the weight of the secondary intergranular phase of the densified composite article.

The starting powder composition additionally contains from about 5% to about 40% by weight of a particulate hard refractory material having an average particle size below about 20 microns, preferably below about 5 microns. The hard refractory material is selected from among the carbides, nitrides, and mixtures thereof including solid solutions, of titanium, vanadium, chromium, zirconium, niobium, molybdenum, hafnium, tantalum, and tungsten. Preferred materials are titanium carbide and hafnium carbide.

Impurities which may be present in the starting powder compositions tend to concentrate in the secondary intergranular phase of the ceramic host matrix during preparation of the densified composite article and can, in some instances, adversely affect the quality of the finished article. A typical undesirable impurity is calcium ion which tends to deleteriously affect the high temperature strength of the secondary intergranular phase. Preferably, the purity of the starting powder is high, having less than about 0.1 weight percent cation impurities.

Impurities may find their way into the finished densified compact during processing steps of a starting powder composition which has the desired initial high purity. Thus, for example, aluminum oxide may become incorporated into the final densified composite article when the component ingredients are mixed by ball milling techniques using alumina milling media. While the introduction of small amounts of aluminum oxide may be acceptable because it enhances the sintering of silicon nitride, large amounts tend to stabilize the glass state of the secondary intergranular phase, in turn weakening the composite at higher temperatures. Preferably aluminum oxide content of composite articles in accordance with this invention is minimized, and should not exceed 3% by weight of the secondary intergranular phase.

In accordance with still another aspect of the present invention, a method is provided for densifying the starting powder compositions to dense, hard composites having densities approaching theoretical. By theoretical density is meant the weighted average of the densities of the components of the composite. The density of the densified compact is a measure of its porosity, the latter decreasing as the actual density of the composite approaches the theoretical value. Since the strength of articles in accordance with this invention decreases with increasing porosity, it is important that the powder compact be densified to a density as nearly approaching theoretical as possible.

In the process for making densified composite articles of this invention, the starting powder compositions are processed to a powder compact of adequate green strength. The green compacts are then densified to near theoretical density by sintering, hot pressing, or sintering followed by hot isostatic pressing.

The starting materials may be processed to a powder compact of adequate green strength by thoroughly mixing the starting materials by processes such as ball milling in a nonreactive liquid medium, such as toluene or methanol, and consolidating the mixture by pressing, extruding, or slip casting. Processing may also optionally include a presintering or prereacting step in which either the uncompacted powder or the powder compact is heated at moderate temperatures. Details of the fabrication of articles in accordance with this invention are given below in Methods I and II.

Methods I and II illustrate methods of preparing abrasion resistant silicon nitride based materials in accordance with this invention. In one method, pressed green compacts containing silicon nitride, a particulate hard refractory material and a sintering or densification aid are sintered to a dense, polycrystalline product. In a second method, dry powdered mixtures of silicon nitride, a particulate hard refractory material, and a densification aid are hot pressed to produce a shaped article comprising a polycrystalline highly densified product.

METHOD I

To one part of a mixture of silicon nitride, hard refractory material, and densification aid are added about 2.5 parts by weight toluene, about 0.1 parts methanol, and about 0.05 parts stearic acid. The resulting slurry is thoroughly mixed by ball milling and then dried at 105° C. The resulting dry mixture is ball milled for about 24 hours and then mixed with about 0.05 parts by weight of polyethylene glycol-methoxy polyethylene glycol copolymer, 1 part toluene and about 0.05 parts methanol. This mixture is ball milled for about 15 minutes, dried at 105° C. and then screened through a 60 mesh screen. The −60 mesh fraction is pressed at about 25,000 psi to obtain a green compact. The residual solvents and binders in the green compact are removed by heating at 600° C. in an inert atmosphere. The green compact is then sintered to a hard, highly densified product by heating to temperatures of 1700°–1850° C.

METHOD II

To one part of a mixture of silicon nitride, hard refractory material, and densification aid are added about 2.5 parts by weight toluene and about 0.1 parts methanol. The resulting slurry is thoroughly mixed by ball milling and then dried at 105° C. The dry mixture is ball milled for about 24 hours and then screened through a 60 mesh screen. The −60 mesh fraction is pressed at about 3000 psi and about 1700° C. to produce a hard, highly densified product.

To enable one skilled in the art to practice this invention, the Examples given in the Table above are provided. The Examples provided in the Table, having the indicated compositions, were sintered to the final densities given in the Table by the process of Method I above. The hardness of each sample was determined on a metallographically polished surface by the indentation hardness test using the Rockwell A-scale ($R_A$). The hardness data for Examples I–VI given in the accompanying Table are plotted versus volume percent hard refractory material content in FIG. 1.

As can be seen in FIG. 1, incorporation of titanium carbide in a two phase ceramic matrix including silicon nitride produces a densified composite which is harder in every case than either silicon nitride or titanium carbide alone. Moreover, in every Example illustrated in FIG. 1, the hardness is greater for each mixture than would be predicted on the basis of a simple law of combination; that is, the hardness of each composite example is greater than the fractional weight of silicon nitride in the composite times the hardness of silicon nitride plus the fractional weight of titanium carbide in the composite times the hardness of titanium carbide.

The plot of hardness data in FIG. 1 also illustrates a marked decrease in hardness with increasing refractory material content above about 60 volume percent. This is attributed to the decreasing ability of the silicon nitride matrix to cement the particles of hard refractory as the volume occupied by those particles exceeds 60% of the volume of the total densified compact.

Figure 3:
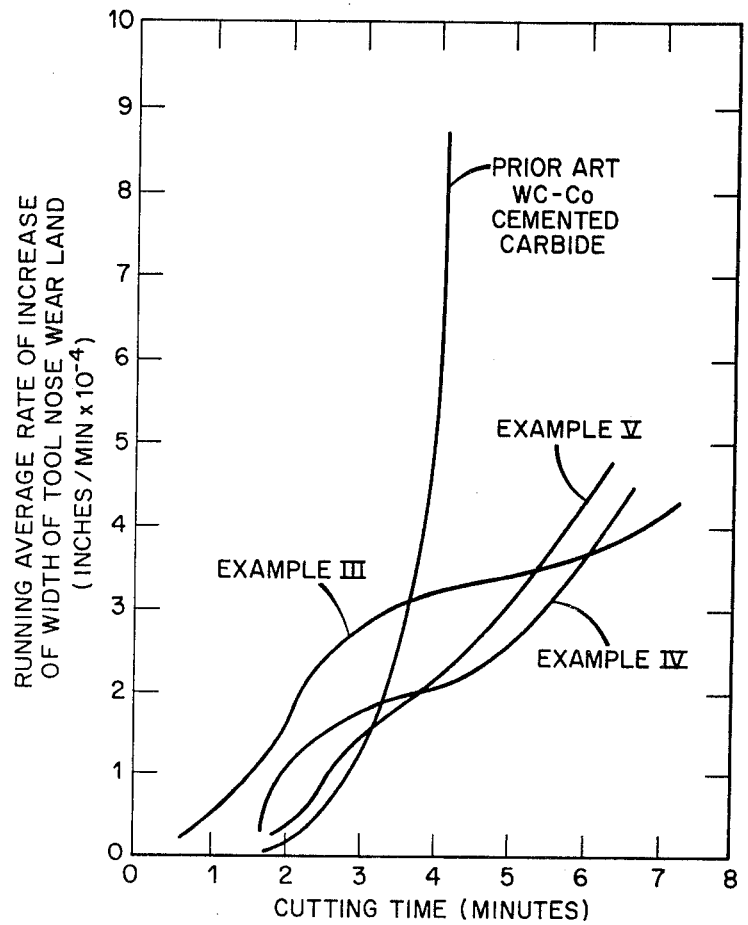
FIG. 3 is a graph illustrating wear resistance of cutting tools in accordance with this invention.

The wear resistance of abrasion resistant articles in accordance with this invention was evaluated for several examples, fabricated into cutting tools and employed under high speed lathe cutting conditions. In one test, a bar of A.I.S.I. 1020 steel was turned on a lathe using a prior art WC-Co cemented carbide tool and tools fabricated from materials having the compositions given by Examples III, IV, and V in the accompanying Table. The effective turning speed was 800 surface feet per minute (SFPM), with the tool moving across the face of the workpiece at a rate of 0.010 inches per revolution (IPR), making a cut 0.050 inches deep. Tool wear was continually monitored and recorded as increase in the width of the tool nose land. The data have been plotted in FIG. 3 which show greatly enhanced wear resistance of tools fabricated of composites in accordance with this invention over that of a typical prior art tool material under the given conditions.

There is thus provided by the present invention improved abrasion resistant materials having high hardness, improved wear resistance, and increased resistance to oxidation. While there have been shown what are at present considered to be the preferred embodiments of the invention, it will be obvious to those skilled in the art that various changes and modifications may be made therein without departing from the scope of the invention as defined by the appended claims.

What is claimed is:

1. A densified composite ceramic cutting tool which retains high creep resistance, fracture toughness, and resistance to oxidation at temperatures above 1200° C., said composite consisting essentially of from about 20 to about 60 volume percent of particles of a hard refractory material having an average size of less than about 5 microns selected from the group consisting of the carbides, nitrides, and mixtures thereof of titanium, vanadium, chromium, zirconium, niobium, molybdenum, hafnium, and tantalum uniformly distributed in a two phase matrix consisting essentially of a first phase of crystalline silicon nitride and a second refractory intergranular phase consisting essentially of silicon nitride, magnesium oxide and silicon dioxide, said magnesium oxide and silicon dioxide comprising from about 1 to about 10 weight percent of said two phase matrix, wherein said second phase contains less than 5 weight percent silicon dioxide, less than 3 weight percent additional additives including cation impurities, the hardness of said composite being greater than 93 on the Rockwell A scale and greater than the combined individual hardness of the fractional weight of silicon nitride times the hardness of silicon nitride plus the fractional weight of hard refractory material times the hardness of the hard refractory material, the density of said composite being greater than 97.5 percent of theoretical density and approaching 100 percent of theoretical density.

2. A densified composite cutting tool according to claim 1 wherein said hard refractory material comprises titanium carbide.

3. A densified composite abrasion resistant ceramic article which retains high creep resistance, fracture toughness, and resistance to oxidation at temperatures above 1200° C., said composite consisting essentially of from about 20 to about 60 volume percent of particles of a hard refractory material having an average size less than about 20 microns selected from the group consisting of the carbides, nitrides, and mixtures thereof of titanium, vanadium, chromium, zirconium, niobium, molybdenum, hafnium, and tantalum uniformly distributed in a two phase matrix consisting essentially of a first phase of crystalline silicon nitride and a second refractory intergranular phase consisting essentially of silicon nitride, magnesium oxide and silicon dioxide, said magnesium oxide and silicon dioxide comprising from about 1 to about 10 weight percent of said two phase matrix, wherein said second phase contains less than 5 weight percent silicon dioxide, less than 3 weight percent additional additives including cation impurities, the hardness of said composite being greater than 93 on the Rockwell A scale and greater than the combined individual hardness of the fractional weight of silicon nitride times the hardness of silicon nitride plus the fractional weight of hard refractory material times the hardness of the hard refractory material, the density of said composite being greater than 97.5 percent of theoretical density and approaching 100 percent of theoretical density.

4. A densified composite abrasion resistant ceramic article in accordance with claim 3 wherein said hard refractory material comprises titanium carbide.

* * * * *